United States Patent [19]
Ericsson

[11] Patent Number: 6,094,023
[45] Date of Patent: Jul. 25, 2000

[54] METHOD AND DEVICE FOR BRAKING AN ALL-MAINS MOTOR

[76] Inventor: Hans Birger Ericsson, Baldersgatan 7, Färjestaden, Sweden, S-386 92

[21] Appl. No.: 09/180,419
[22] PCT Filed: May 9, 1997
[86] PCT No.: PCT/SE97/00766
  § 371 Date: Nov. 10, 1998
  § 102(e) Date: Nov. 10, 1998
[87] PCT Pub. No.: WO97/43821
  PCT Pub. Date: Nov. 20, 1997

[30] Foreign Application Priority Data

May 10, 1996 [SE] Sweden .................................. 9601805

[51] Int. Cl.[7] .................................. H02P 3/10; H02P 3/20
[52] U.S. Cl. .......................... 318/362; 318/368; 318/370
[58] Field of Search ..................................... 318/360–496, 318/798, 759, 803, 778, 811, 762, 761, 809, 729; 364/140, 131, 571.07; 310/210, 50; 200/12, 157

[56] References Cited

U.S. PATENT DOCUMENTS

| | | | |
|---|---|---|---|
| 3,628,112 | 12/1971 | Gross | 318/258 |
| 3,731,149 | 5/1973 | Sherman et al. | 317/11 A |
| 3,794,898 | 2/1974 | Gross | 318/380 |
| 4,092,577 | 5/1978 | Markham | 318/387 |
| 4,459,522 | 7/1984 | Huber | 318/293 |
| 4,482,853 | 11/1984 | Bhavsar | 318/778 |
| 4,489,257 | 12/1984 | Lindow | 318/258 |
| 4,556,831 | 12/1985 | Sakamoto et al. | 318/434 |
| 4,905,300 | 2/1990 | Bhagwat et al. | 388/800 |
| 5,063,319 | 11/1991 | Mason et al. | 310/210 |
| 5,099,184 | 3/1992 | Hornung et al. | 318/375 |
| 5,294,874 | 3/1994 | Hesseberger et al. | 318/759 |
| 5,361,022 | 11/1994 | Brown | 318/375 |
| 5,455,762 | 10/1995 | Braun | 364/140 |
| 5,847,533 | 12/1998 | Hakala et al. | 318/798 |

FOREIGN PATENT DOCUMENTS

| | | |
|---|---|---|
| 1947721 | 4/1971 | Germany . |
| 3940849 | 5/1990 | Germany . |
| 1094124 | 5/1984 | U.S.S.R. . |
| 2107538 | 1/1983 | United Kingdom . |

*Primary Examiner*—Paul Ip
*Attorney, Agent, or Firm*—Jacobson, Price, Holman & Stern, PLLC

[57] ABSTRACT

A method and a device for electrical braking of an all-mains motor by which disconnection of supplied feed current to the motor causes an electric switching operation, whereby electric current arranged to cause a reversed rotary direction for the rotor (1) of the motor is supplie. According to the invention, supplied braking power (P) is controlled and reduced on basis of the successive reduction of rotary speed for the motor until the rotor (1) of the motor has substantially completely ceased to rotate, preferably substantially corresponding to an inverted "soft start" for the motor, whereafter supplied braking current feed is interrupted. It is advantageously monitored whether or not normal start of the motor has been performed, electric switching to braking only being made possible provided that such a start sequence has been indicated.

8 Claims, 3 Drawing Sheets

6,094,023

METHOD AND DEVICE FOR BRAKING AN ALL-MAINS MOTOR

TECHNICAL FIELD

The present invention relates to a method and a device for braking an all-mains motor, preferably to a stationary position.

STATE OF ART

Electric all-mains motors are used as drive sources for a number of different applications, e.g. for various types of hand tools such as drilling machines, rotary saws (having single as well as double saw blades, rotating in an opposed relationship to each other) and angle grinders.

Any possibility to electrically perform fast braking of such a machine is not known, and mechanical braking means are normally not used for this purpose, since such a solution is technically complicated and results in an increased weight.

To reverse the rotary direction of an all-mains motor without disconnecting the feed current is disclosed as previously known in DE-A1-3 940 849, but this solution is only intended to change the rotary direction in shortest possible time and to accomplish full rotary speed, i.e. a solution to the present problem of braking the all-mains motor to a stationary position is not disclosed.

SUMMARY OF THE INVENTION

The object of the present invention is to disclose a previously not utilized possibility of fast braking action for an all-mains motor by means of an electrical switching operation. A device according to the invention influences thus the weight of a machine to a minimal extent, and acts as a substantial protection against injuries, since a rotating and cutting tool of a machine can be stopped to a substantially stationary position substantially immediately when an operation has been completed.

The method according to the present invention for electrical braking of an all-mains motor comprises use of an electric switching operation arranged to cause a reversal rotary direction for the motor, and it is mainly characterized in that disconnection of supplied feed current to the motor causes an electric switching operation, whereby electric current arranged to cause a reversed rotary direction for the rotor of the motor is supplied, and that supplied braking power is controlled and reduced on basis of the successive reduction of rotary speed for the motor until the rotor of the motor has substantially completely ceased to rotate, whereafter supplied braking current feed is interrupted. It is advantageously monitored whether or not normal start of the motor is performed, electric switching to braking only is made possible provided that such a start sequence has been indicated.

The device for utilization of the method according to the present invention is mainly characterized in that it includes electric switch means for switching supplied electric current in such a way that the rotor of the motor attempts to take up a reversed rotary direction when the normal current feed to the motor is interrupted, and that means are arranged to control supplied braking electric power so that a successively reduced power related to present actual continuously reduced rotary speed of the motor is performed, preferably substantially corresponding to an inverted "soft start" for the motor, supplied braking current feed being interrupted when the rotor of the motor substantially or completely has stopped to rotate.

BRIEF DESCRIPTION OF THE DRAWINGS

A number of non-restricting examples of embodiments of a device for utilization of the method according to the present invention, and certain modifications, will be more fully described below with reference to the accompanying drawings, in which.

EMBODIMENTS FOR UTILIZATION OF THE INVENTION

The present invention is based on the fact that manufacturers of all-mains motors design the windings of the motor in such a way, that same always rotates in a predetermined direction with maximum effect when connected to an alternating current source.

Figure 1:
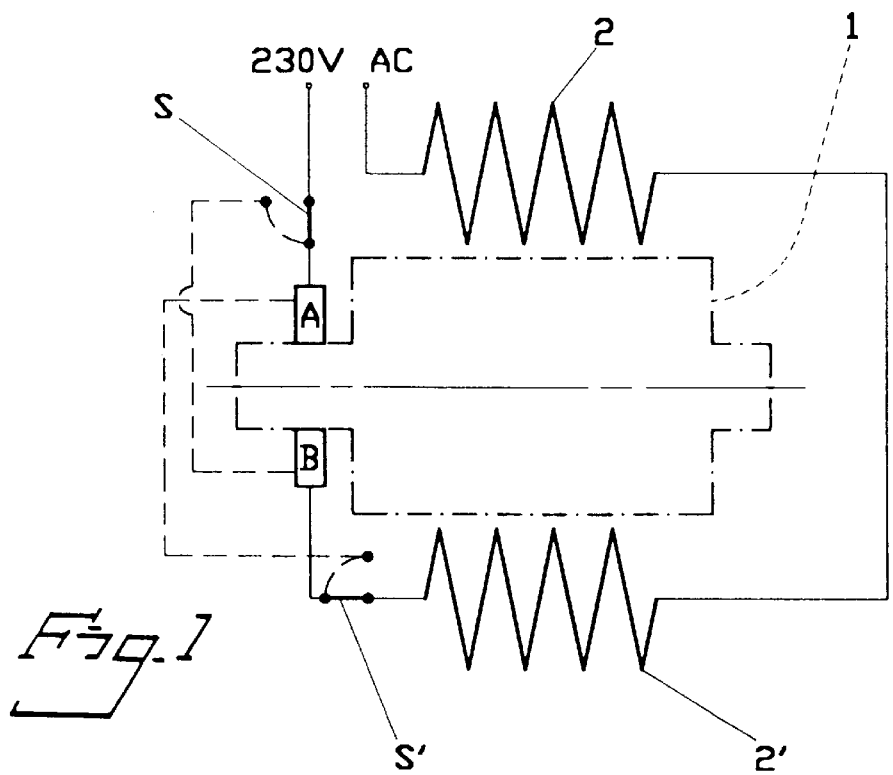
FIG. 1 is an elementary circuit diagram of an all-mains motor during normal operation, having a second and braking circuit, connectable by means of an associated switching means, shown in broken lines.

A circuit of this type is illustrated in FIG. 1, and this figure shows a rotor 1 located between two stator coils 2, 2', an end portion of said rotor 1 being arranged with two carbon electrodes A, B.

During shown normal operation, a first carbon electrode A is directly connected to an alternating current source (denominated 230V AC), and said alternating current source is also connected to the input of a first stator coil 2, connected to a second stator coil 2'. The output from the second stator coil 2' is connected to the second carbon electrode B.

FIG. 1 also shows two switch means S, S', whereby switching can be performed from the above described circuit to a braking circuit, indicated in broken lines in FIG. 1.

Figure 2:
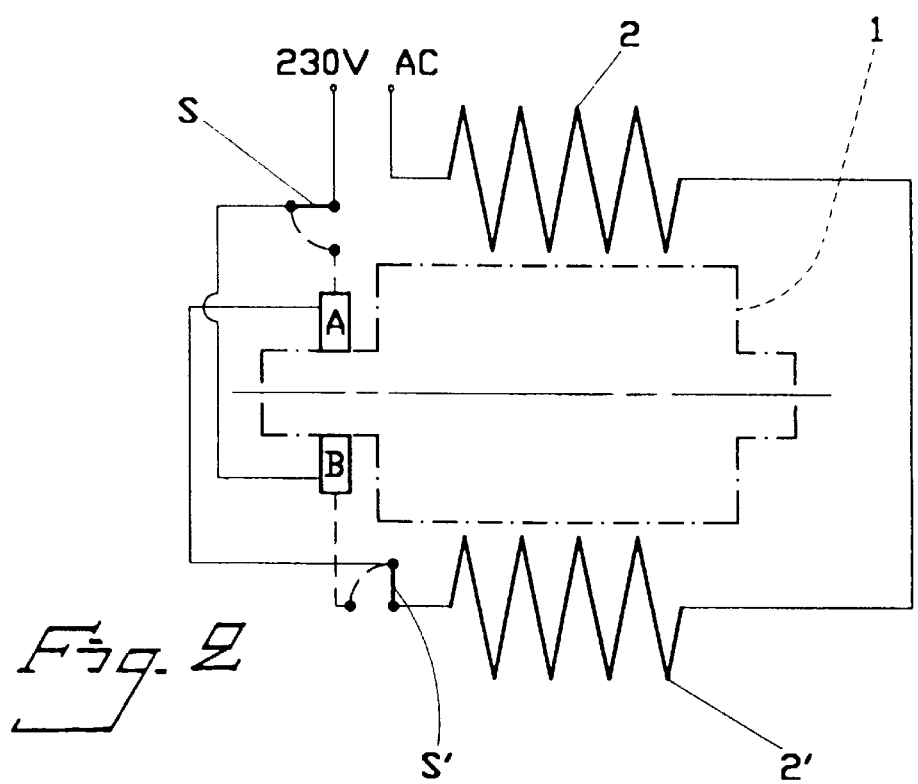
FIG. 2 is a circuit diagram corresponding to FIG. 1 when switching to a braking operation has been performed.

When performing a braking operation, the switch means S, S' are switched to the circuit shown in continues lines in FIG. 2, i.e. the connection of the alternating current source to the carbon electrode A is shifted to the carbon electrode B and the output from the second stator coil 2' is shifted from the carbon electrode B to the carbon electrode A.

This switch of circuit results in principal in reversal of the motor, i.e. a considerable braking force is accomplished and maintained until the rotary speed of the motor is decreased to substantially nil.

Figure 3:
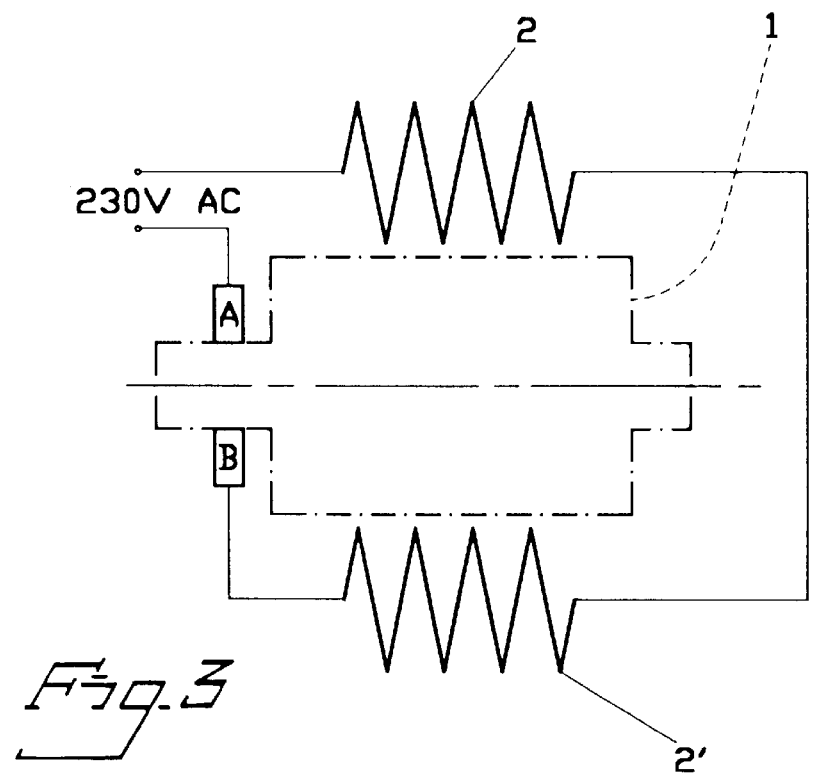
FIG. 3 is a circuit diagram substantially corresponding to FIG. 1, i.e. showing an all-mains motor during normal operation.
Figure 4:
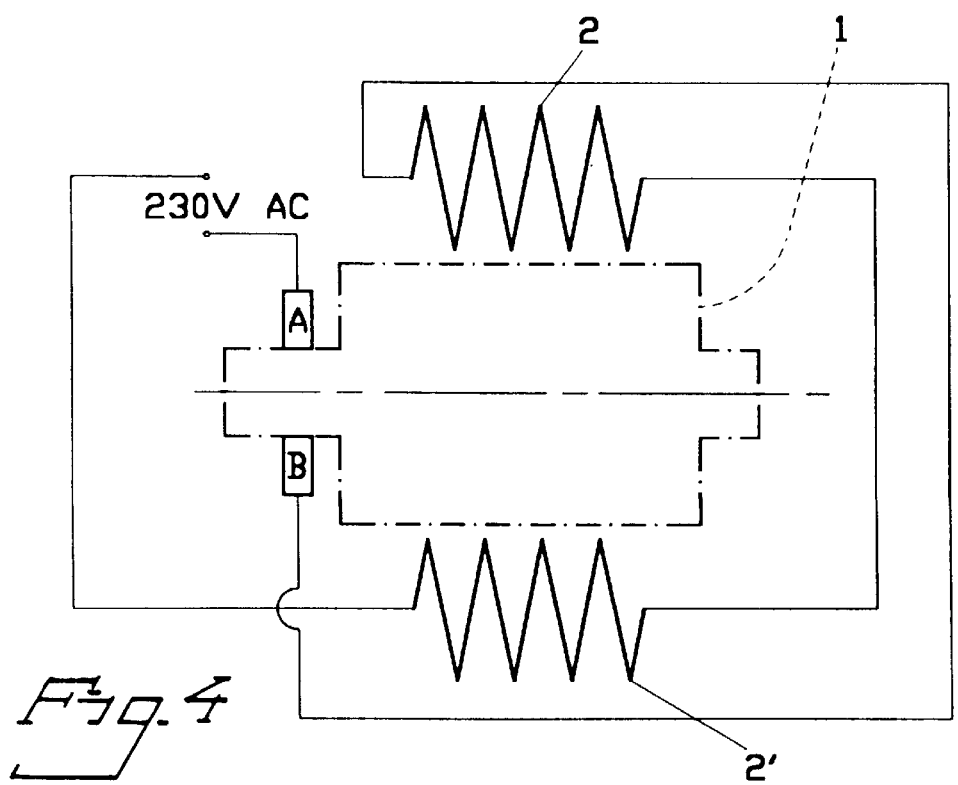
FIG. 4 is a circuit diagram after switching to a braking operation from the feeding circuit shown in FIG. 3.

The above described braking force can also be accomplished by an alternative switching of circuits, as shown in FIGS. 3 and 4.

FIG. 3 is intended to disclose a normal connection during operation, and corresponds to what has been shown and described with reference to FIG. 1. In order to simplify the disclosure, required switch means (S, S') for switching to a braking operation have been excluded from FIGS. 3 and 4.

When performing a braking operation, according to this embodiment the feeding point to the stator coils 2, 2' is shifted, whereby the previous input to the first stator coil 2 becomes output, whereas the previous output from the second stator coil 2' will serve as input, connected to the alternating current source (230V AC). As shown in FIG. 3, the second stator coil 2' is disconnected from the carbon electrode B, which is connected to the output of the first stator coil 2 (which previously acted as input connected to the alternating current source).

The solution described with reference to FIGS. 3 and 4 results in a braking power corresponding to what is achieved with a solution according to FIGS. 1 and 2.

However, above described principles for establishing a braking force requires certain additions in order to avoid that a powerful braking action is followed by rotation of the motor in an opposed direction to a first rotary direction.

Figure 5:
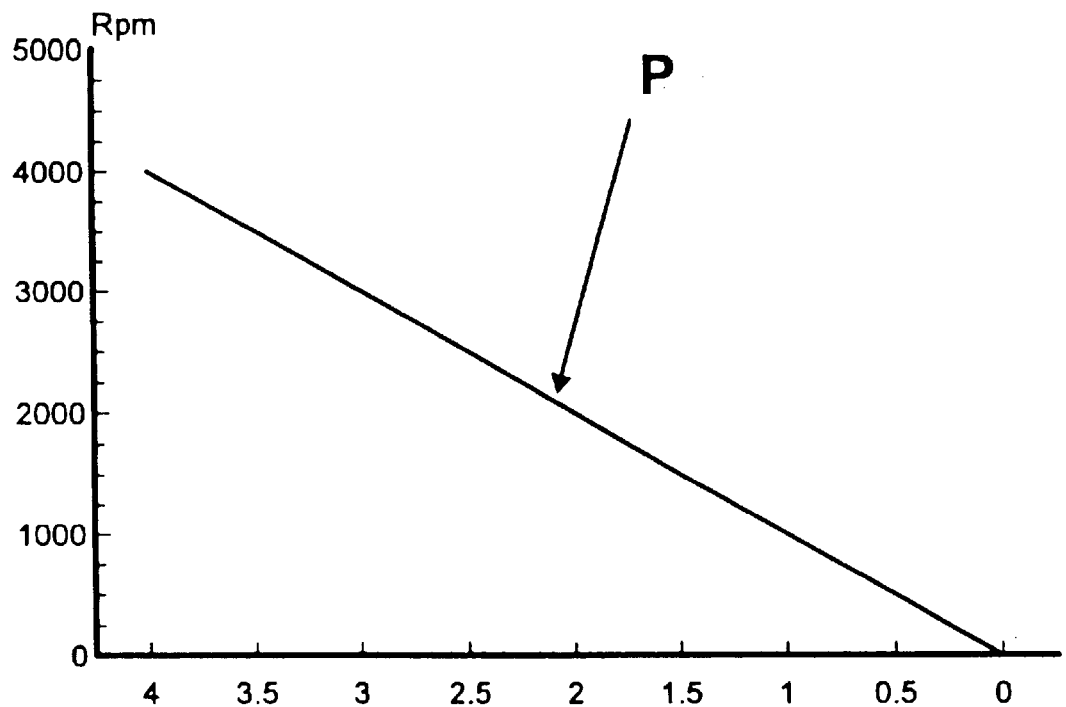
FIG. 5 is a diagram intended to schematically disclose how supplied power during a braking operation is successively reduced as the rotary speed is decreased.

Accordingly, a braking operation should be performed with a successively reduced supplied braking effect P, a condition which is schematically illustrated in FIG. 5, which figure simplified illustrates the effect reduction as a linear function. The effect curve must obviously not be linear. Obviously must also supplied electric current be interrupted when the motor completely, or substantially completely, stopped its rotary movement, in order to avoid previously mentioned rotation in a second rotary direction.

This effect reduction, with associated automatic interruption a feed current, can be accomplished in a number of ways, which are easily implemented by a person skilled in the art.

As an example of a suitable method can be stated use of pulses generated by the rotation of the motor during a braking operation, which can be used to operate a thyristor, triac or any other suitable semiconductor component in such a way that supplied effect is successively reduced. Received train of pulses from the motor can also be used to decide when supplied power during a braking operation should be interrupted (by monitoring when the number of pulses during a certain predetermined time period are reduced to a predetermined number). Alternatively may automatic disconnection of supplied current during a braking operation be related to the size of supplied braking effect P, i.e. when said power P has been reduced to a predetermined limit, the current feed is interrupted. Combinations of the above solutions may obviously also be used, as well as other known circuit solutions.

The braking time can also be controlled by the effect curve for supplied braking effect P, and in principle should braking be performed as a "reversed soft start". In this connection, it is absolutely unsuitable to perform a braking operation with continuously supplied full power, since this results in risk for damage and wear to components included in the motor.

The circuit solutions used for the above mentioned "reversed soft start" during a braking operation may advantageously include one or a number of components from the electric circuit controlling start of the motor. This means that only a few additional components are required for the control circuit operating during a braking sequence.

In order to secure that the control circuit for a braking sequence is not activated unless the motor has received a feed current and started to rotate, a logic circuit should obviously also be used monitoring whether or not a conventional start of the motor has been performed. The braking circuit should thus preferably only be arranged activated provided that start of the motor has been performed.

As previously mentioned, supplied effect P during a braking sequence is related to present rotary speed of the motor. For example, if the rotary speed of a drilling machine, rotary saw or similar driven by the motor is reduced during an operation, e.g. due to the fact that the drill or saw blade due to heat expansion or other reasons reduces the rotary speed of the motor, the effect supplied during an initial stage of a braking operation should obviously be related to present rotary speed of the motor.

Shown and described embodiments are only intended to serve as examples of embodiments for utilization of the method according to the present invention, and may thus be further modified within the scope of the inventive thought and the following claims.

In particular may the electric circuits utilised for monitoring and control of a braking sequence be designed in a number of different ways, but in view of the fact that this falls within the scope of knowledge for a person skilled in the art, only the functions have been referred to as examples intended to facilitate design of associated circuits.

What is claimed is:

1. Method for electrical braking of an all-mains motor by means of an electric switching operation of the feed current supplied to the motor intended to cause a reversed rotary direction for a rotor of the motor, said method comprising:

monitoring whether or not a normal start operation of the motor has been performed when supplied feed current to the motor is interrupted, and only performing a switching operation arranged to cause braking when an abnormal start sequence is being indicated, and controlling supplied braking power and reducing supplied braking power on a basis of successively reduced rotary speed of the motor until the rotor of the motor has substantially or completely ceased to rotate, where after supplied feed of braking current is interrupted.

2. Device for electrical braking of an all-mains motor, said device comprising: electric switch means for switching supplied electric current in such a way that a rotor of the motor attempts to take up a reversed rotary direction, means for monitoring whether or not conventional start of the motor has been performed, switching to a braking operation only being made possible provided that said means has indicated such a start sequence and provided that a normal current feed to the motor is interrupted, and means for controlling supplied braking electric power so that a successively reduced power related to present actual continuously reduced rotary speed of the motor is performed, substantially corresponding to an inverted soft start for the motor, supplied braking current feed being interrupted when the rotor of the motor has substantially or completely stopped rotating.

3. Device according to claim 2, wherein current feed to a first carbon electrode at the rotor is switched to a second carbon electrode at the rotor, and that a connection of included stator coils to the second carbon electrode is switched to the first carbon electrode during an electric switching operation for braking.

4. Device according to claim 2, wherein the connections of included stator coils to a power source and a carbon electrode included in the motor are switched during an electric switching operation for braking.

5. Device according to claim 2, wherein a pulse train generated by the motor indicating present rotary speed is utilized to control a power regulating means to continuously adjust supplied braking power to present actual rotary speed for the motor.

6. Device according to claim 2, wherein current supplied to the braking circuit is interrupted when a pulse train generated by the motor, a predetermined time related condition and/or supplied braking power has been reduced to a predetermined value.

7. Device according to claim 2, wherein the electric circuit for control of a braking sequence includes at least one electric component also used for the soft start of the motor.

8. Device according to claim 2, wherein the electric circuit for control of a braking sequence is arranged to be activated when a manually operable electric switching means for start of the motor is released.

* * * * *